(12) United States Patent
Tabor

(10) Patent No.: US 7,280,723 B2
(45) Date of Patent: Oct. 9, 2007

(54) ILLUMINATION ASSEMBLY INCLUDING A RIGID LIGHT-GUIDING ELEMENT INCORPORATING A NUMERICAL-APERTURE ALTERATION TAPER

(75) Inventor: Kevin Tabor, Webster, MA (US)

(73) Assignee: Schott Corporation, Elmsford, NY (US)

( * ) Notice: Subject to any disclaimer, the term of this patent is extended or adjusted under 35 U.S.C. 154(b) by 0 days.

(21) Appl. No.: 11/411,637

(22) Filed: Apr. 26, 2006

(65) Prior Publication Data

US 2006/0250814 A1 Nov. 9, 2006

Related U.S. Application Data

(60) Provisional application No. 60/678,885, filed on May 6, 2005.

(51) Int. Cl.
*G02B 6/26* (2006.01)
(52) U.S. Cl. ............... 385/39; 385/43; 385/89; 385/111; 385/115; 385/116; 385/120; 385/121
(58) Field of Classification Search ............ 385/43, 385/89, 111, 115, 116, 120, 121
See application file for complete search history.

(56) References Cited

U.S. PATENT DOCUMENTS

| 3,912,362 | A | * | 10/1975 | Hudson ................ 385/54 |
| 4,474,429 | A | * | 10/1984 | Yoldas et al. ........... 385/43 |
| 5,268,978 | A | * | 12/1993 | Po et al. .............. 385/33 |
| 5,862,278 | A | * | 1/1999 | Brauch et al. ........... 385/34 |
| 6,208,788 | B1 | | 3/2001 | Nosov |
| 6,246,817 | B1 | * | 6/2001 | Griffin ................ 385/43 |
| 6,272,269 | B1 | | 8/2001 | Naum |
| 6,317,550 | B2 | * | 11/2001 | Irie et al. .............. 385/43 |
| 6,434,302 | B1 | * | 8/2002 | Fidric et al. ............ 385/43 |
| 6,543,925 | B2 | | 4/2003 | Kuykendal et al. |
| 6,585,402 | B2 | | 7/2003 | Ohkodo et al. |
| 6,832,849 | B2 | | 12/2004 | Yoneda et al. |
| 6,980,717 | B2 | * | 12/2005 | Watanabe et al. ........ 385/33 |
| 7,046,875 | B2 | * | 5/2006 | Gonthier et al. ........ 385/28 |

(Continued)

OTHER PUBLICATIONS

Scifres et al. (U.S. Pat. Re. 33,722).*

*Primary Examiner*—Frank G. Font
*Assistant Examiner*—James P. Hughes
(74) *Attorney, Agent, or Firm*—Louis J. Franco; Law Office of Louis J. Franco

(57) ABSTRACT

An illumination assembly includes a light-emitting element that emits light over a light-source numerical aperture and an elongated light-guiding element including opposed incident and emission ends between which ends light propagates by total internal reflection. The light-guiding element includes along a portion of its length a numerical-aperture alteration taper having opposed small and large ends exhibiting, respectively, a small-end numerical aperture and a large-end numerical aperture lower in magnitude than the small-end numerical aperture. The alteration taper is oriented such that the small end is more proximate the incident end than the large end. The incident end is in light-collecting proximity and alignment with the light-emitting element such that light emitted from the light-emitting element over the small-end numerical aperture and received into the small end of the alteration taper is emitted from the emission end of the light-guiding element at an emission numerical aperture lower in magnitude than the small-end numerical aperture.

15 Claims, 8 Drawing Sheets

U.S. PATENT DOCUMENTS 7,090,411 B2 *  8/2006  Brown ........................ 385/92
2001/0031115 A1  10/2001  Chen et al.
2004/0149998 A1  8/2004  Henson et al.
2004/0179349 A1  9/2004  Buelow, II et al.

* cited by examiner

ILLUMINATION ASSEMBLY INCLUDING A RIGID LIGHT-GUIDING ELEMENT INCORPORATING A NUMERICAL-APERTURE ALTERATION TAPER

PROVISIONAL PRIORITY CLAIM

Priority based on Provisional Application, Ser. No. 60/678,885 filed May 6, 2005, and entitled "ILLUMINATION ASSEMBLY INCLUDING A RIGID LIGHT-GUIDING ELEMENT INCORPORATING A NUMERICAL-APERTURE ALTERATION TAPER" is claimed. Disclosure Document No. 569580 is also referenced and relied upon for purposes of establishing an independently verified and recorded date of conception of no later than Feb. 3, 2005.

BACKGROUND

1. Field

Although not so limited in its utility or scope, implementations of the present invention are particularly well suited for use in vehicle headlamps.

2. Brief Description of Illustrative Environments and Related Art

Manufacturers of automotive headlamps have begun considering the use of arrayed light-emitting diodes (LEDs) in place of conventional light bulbs as a light source within headlamp assemblies. LEDs exhibit, among other advantages over conventional light bulbs, high illumination, reliability and long life. Moreover, LED's are easily handled in automated fabrication processes resulting in LED arrays. One drawback of LED technology is that the closeness with which the LEDs can be spaced is limited by the packaging surrounding each LED. As a consequence of LED-packaging limitations, the constituent LEDs of an LED array cannot be brought into sufficiently close mutual proximity to provide the light intensity (i.e., illumination per unit area) required of devices such as automobile headlamps. Another obstacle to the application of LED technology in headlamps is that a typical LED emits light over a much greater numerical aperture (e.g., "half angle") than is desired or, indeed, permissible for a headlamp.

Accordingly, there exists a need for an illumination assembly that efficiently collects, concentrates, transmits and contiguously and uniformly projects the light emitted from an arrangement of discretely arrayed light-emitting elements such as LEDs.

SUMMARY

An illustrative illumination assembly includes a light-emitting element having a light-emitting surface that emits light over a light-source numerical aperture. An elongated light-guiding element includes opposed incident and emission ends, an optical core extending between the incident and emission ends and an optical cladding disposed about the core, wherein the core and cladding exhibit relative refractive indices that facilitate light propagation by total internal reflection through the light-guiding element. The light-guiding element includes along a portion of its length a numerical-aperture alteration taper having opposed small and large ends exhibiting, respectively, a small-end numerical aperture and a large-end numerical aperture lower in magnitude than the small-end numerical aperture. The alteration taper is oriented with the small end more proximate the light-emitting element or, more generally, the incident end of the light-guiding element, than the large end and the incident end of the light-guiding element is in light-collecting proximity and alignment with the light-emitting surface of the light-emitting element such that light emitted from the light-emitting element and received into the small end of the alteration taper over the small-end numerical aperture is emitted from the emission end of the light-guiding element at an emission numerical aperture lower in magnitude than the small-end numerical aperture. In addition to the alteration taper, a typical embodiment is configured such that the light-guiding element further includes along a portion of its length a light-conducting segment that is relatively non-tapered with respect to the alteration taper and which has first and second ends between which light is propagated by total internal reflection.

An illustrative alteration taper as defined for purposes of this specification and the appended claims is typically of generally conical shape and alternatively assumes a cross-sectional geometry as viewed into a plane orthogonal to light propagation therethrough of, for example, circular, elliptical, square, rectangular, hexagonal and octagonal, by way of non-limiting example. The alternation taper furthermore comprises a core material having a first refractive index clad by a second material having a second refractive index lower than the first refractive index in order to facilitate the propagation of light through the taper by total internal reflection. Methods of fabricating such a taper are known to those of ordinary skill in the art. However, one illustrative enabling method begins with the creation of a basic light conduit comprising a cladding material collapsed about a core material. Known to those of skill in the relevant arts is that such a conduit exhibits a numerical aperture the mathematical expression for which is $NA=(n_1^2-n_2^2)^{1/2}$ where $n_1$ represents the refractive index of the core material and $n_2$ represents the refractive index of the cladding material. An intermediate portion of the basic light conduit is heated and stretched such that the intermediate portion is gradually constricted and exhibits a diameter and cross-sectional area that varies with position along the length of the conduit within the stretched intermediate portion (i.e., transition region) such that the basic conduit assumes what is referred to in the art as an "hour glass" shape. If the basic conduit is cut at the center of the transition region, for example, two tapered conduits are formed each of which tapered conduits includes a tapered segment and a segment of relatively constant diameter and cross-sectional area. It will be appreciated that, if desired, a taper exhibiting a diameter and a cross-sectional area that vary over its full length may also be cut from the transition region or from the tapered segment of a tapered conduit. A cladded-core taper made in accordance with the aforementioned or some alternative method includes opposed small and large ends. The small end of the taper exhibits a numerical aperture corresponding to the numerical aperture of the basic light conduit from which the taper was formed, a phenomenon that is generally true regardless of from where along the transition region the small end was cut. However, the larger end exhibits a different numerical aperture that is lower in magnitude than the numerical aperture of the small end of the taper. The value of the numerical aperture at the large end is equal to the inverse of the magnification ratio of the taper multiplied by the numerical aperture of the basic light conduit from which the taper was formed. Accordingly, in going from the small end to the large end, the magnitude of the numerical aperture of the taper is reduced.

In alternative versions, the alteration taper is variously located along the length of the light-guiding element. In one version, for example, the alteration taper is situated such that the small end thereof constitutes the incident end of the light-guiding element and such that the large end is connected to (e.g., integral with or joined at an interface) the first end of the relatively non-tapered segment. In another configuration, the small and large ends of the alteration taper are situated between, and distinct from, the incident and emission ends of the light-guiding element. Moreover, in such a version, the small end of the alteration taper is connected to the secondary end of a first non-tapered segment and the large end is connected to the first end of a second non-tapered segment. The primary end of the first non-tapered segment serves as the incident end of the light-guiding element while the second end of the second non-tapered portion serves as the emission end of the light-guiding element. In still a third configuration, the large end of the alteration taper serves as the emission end of the light-guiding element and the small end is connected to the secondary end of a non-tapered segment.

Because, as suggested by previous description, each light-guiding element may comprise an alteration taper that is either integrally formed along a portion of the length of the light-guiding element or that has at least one of its small and large end faces attached to an end of a light conduit, the term "elongated light-guiding element" is used broadly throughout the specification and claims and can include multiple (i.e., a plurality of two or more) light-guiding sub-elements combined to form an optical light-guiding train defined by at least two sequentially arranged sub-elements one of which sub-elements is an alteration taper. Furthermore, in any of the configurations described above or below, and especially in the appended claims, a non-tapered segment (i.e., non-tapered relative to the alternation taper) is, alternatively, a (i) a clad rod segment through which light propagates by total internal reflection and (ii) a light-guiding bundle (e.g., an "image bundle" or "fused optical fiber bundle") of at least two adjacently abutting light-guiding constituent elements through each of which constituent elements light propagates by total internal reflection. As explained in more detail in the detailed description, a non-tapered segment through which light propagates by total internal reflection exhibits a collecting and emitting numerical aperture. Moreover, regardless of whether a non-tapered segment is specifically referred to as "relatively non-tapered" or simply as "non-tapered," the term "non-tapered segment," and semantic variations thereof, is to be read as "non-tapered relative to the alteration taper". According, the term is not restricted to, for example, clad rod segments and light-guiding bundles of non-varying diameter and cross-sectional areas and geometry.

Various embodiments of an illumination assembly further include a light-redirecting element. In some versions, the light-redirecting element is a refractive element including a light-acceptance surface in light-collecting proximity with the emission end of the light-guiding element. Illustrative, non-limiting, refractive elements include a lens for focusing or a dispersive element for spreading light received by the refractive-element through the light-acceptance surface. Alternatively, the light-redirecting element is a reflective element such as a planar or concave mirror or a mixing tunnel that may either focus or disperse light emitted from the emission end of the light-guiding element.

In various implementations, light-collection efficiency and the efficiency of transmission of light through the optical train defined by and between the light-emitting element, the light-guiding element and the light-redirecting element are optimized by selecting light-emitting and light-collecting components exhibiting numerical apertures such that, at any given emitting-accepting optical interface or coupling, the accepting (i.e., collecting) numerical aperture is not lesser in magnitude than the emitting numerical aperture over which light is being supplied at that interface. In a typical embodiment, however, the light-emitting element exhibits the highest numerical aperture and the light-redirecting element projects light over the lowest numerical aperture, a parameter that seems contradictory to the satisfaction of the optimum numerical-aperture parameters at all interfaces along the optical train. However, the alteration taper, by reducing numerical aperture continuously over its length, facilitates the optimum numerical-aperture parameters at the interfaces. Moreover, where the light-redirecting element is a refracting focusing element (e.g., a lens), it collects light over a larger numerical aperture than that at which it projects light. Illustrative manners by which this mode of optimization is achieved are more completely described in the detailed description.

Alternative variations of an illumination assembly include at least one of (i) multiple (i.e., a plurality of at least two) light-emitting elements and (ii) multiple elongated light-guiding elements. In one such embodiment, an illumination assembly includes a plurality of at least two light-emitting elements spatially arranged in accordance with a predetermined first illumination-array format. In alternative versions, the light-emitting elements are arranged in a two-dimensional planar array or a curved array. Moreover, the light-emitting elements of a typical embodiment are light-emitting diodes (LEDs), although the scope of the invention is not restricted to the use of LEDs. The arrangement of light-emitting elements is defined by an illumination-array density indicative of a quantity of light-emitting elements per unit area along a real surface or defining an imaginary surface. For instance, in the latter case, the light-emitting elements may not actually be mounted or otherwise depend from or be supported by a planar or curved structure, but may by arranged and retained in place in a manner such that they represent points or locations along a line, curve or planar or curved surface, for example. In a typical version, the spatial arrangement of the light-emitting elements is such that the light-emitting elements are separated from one another (i.e., not touching) by a predetermined distance.

In alternative versions, the illumination assembly further includes a light-conduction assembly the purpose of which is to transmit light emitted from the arrangement of light-emitting elements as a whole from a first density to a second, more dense (e.g., more closely spaced) configuration and uniform (e.g., less discrete) output. An illustrative light-conduction assembly includes a common output end and at least one elongated light-guiding branch element corresponding to each light-emitting element in the arrangement of light-emitting elements. Each light-guiding branch element (i) includes opposed incident and emission ends, (ii) is rigid over the entirely of its length between its incident and emission ends, and (ii) may assume, for example, the general form of any of the alternatively configured light-guiding elements described above. It will be appreciated that because each light-guiding branch element is "rigid over the entirety of its length . . . ," each light-guiding branch element exhibits a configuration that may be alternatively and interchangeably referred to as "fixed," "definite," or "permanent" over the entirety of its length between the incident and emission ends thereof. The incident end of an elongated light-guiding branch element exhibits an incident face to the light-emitting element corresponding to that light-guiding branch element and the emission end includes an emission face coinciding with the common output end of the light-conduction assembly. The rigid light-guiding branch elements are secured in mutually-fixed relationship such that (i) they combine to form a rigid, unitary light-conduction assembly, (ii) the incident ends of the light-guiding branch elements are retained in fixed spatial relationship in accordance with a predetermined collection-array format exhibiting a collection-array density and corresponding to the spatial arrangement of light-emitting elements, and (iii) the emission ends of the light-guiding branch elements are retained in accordance with a predetermined output-array format exhibiting an output-array density more dense than the collection-array density. In many versions, at least one of (i) the incident ends of light-guiding branch elements are retained in spaced-apart relationship in accordance with a predetermined collection-array format corresponding to a fixed, spaced-apart arrangement of plural light-emitting elements and (ii) the emission ends of the light-guiding branch elements are adjacently fused or otherwise secured (e.g., by an epoxy or other selectively curable adhesive for example) in contacting relationship such that their emission ends collectively form a continuous output face that emits light collected from the plural light-emitting elements over a collective output numerical aperture. Alternatively, or in addition, various light-guiding branch elements are retained in mutually fixed spatial relationship by an injection molding process according to which a plastic or other polymeric material is injected or otherwise introduced to fill any interstices between and among the light-guiding branch elements in the light-conduction assembly.

The light-guiding branches are, in alternative versions, variously configured. Various embodiments are concerned with efficiency with which light emitted from a light-emitting element is collected through the incident end of a light-guiding branch element for transmission to the emission end thereof. In some illustrative versions, each light-guiding branch element of a selected set of light-guiding branch elements exhibits to a light-emitting element a planar incident face. The planar incident face of each light-guiding branch element of a selected set of light-guiding branch elements extends along a light-collection plane defined by an incident normal that is optically oriented and aligned with respect to a light-emitting element in a manner predetermined to maximize the efficiency of the collection of light emitted by the light-emitting element into that light-guiding element.

An important aspect of various implementations is "matching" or "rendering compatible" the incident numerical aperture of a light-guiding branch element and the light-source numerical aperture of the light-emitting element to which that light-guiding branch element corresponds. Moreover, in some versions, the light output from the common output end of the light-conduction assembly is collected and redirected by an optical element such as a lens and, in various such versions, compatibility between the output numerical aperture of the light-conduction assembly and the acceptance numerical aperture of the light-redirecting element is also an important objective. Observance of these objectives as design parameters for any particular embodiment facilitates the maximization of light collection, transmittance and projection. Because the light-source numerical apertures of the light-emitting elements in a typical embodiment differ from (e.g. are larger than) the acceptance numerical aperture of the light-redirecting element, the incident numerical aperture of a light-guiding branch element differs from the output numerical aperture at the common output end and, hence, the emission numerical aperture of the emission end of a light-guiding branch element. The desired differential in numerical aperture is achieved, in various aspects, through a numerical-aperture alteration taper as previously described.

As previously explained, the light-conduction assembly may be variously configured so as to define a collection-array density that is less dense than the output-array density. In some illustrative implementations, an output-array format is rendered denser than the collection-array format with which it is associated by forming bends in at least some of the light-guiding branch elements prior to adjacently retaining the light-guiding branches in mutually fixed positions. In other implementations, each light-guiding branch element is straight and plural such branch elements are fixedly retained such that they mutually converge toward the common output end of the light-conduction assembly.

Representative, non-limiting embodiments are more completely described and depicted in the following detailed description and the accompanying drawings. Although specific versions are described as embodied as automotive headlamps, within the scope and contemplation of the invention as expressed in the appended claims are embodiments for alternative applications.

DETAILED DESCRIPTION

The following description of various embodiments of an illumination assembly is illustrative in nature and is therefore not intended to limit the scope of the invention or its application of uses.

Figure 1:
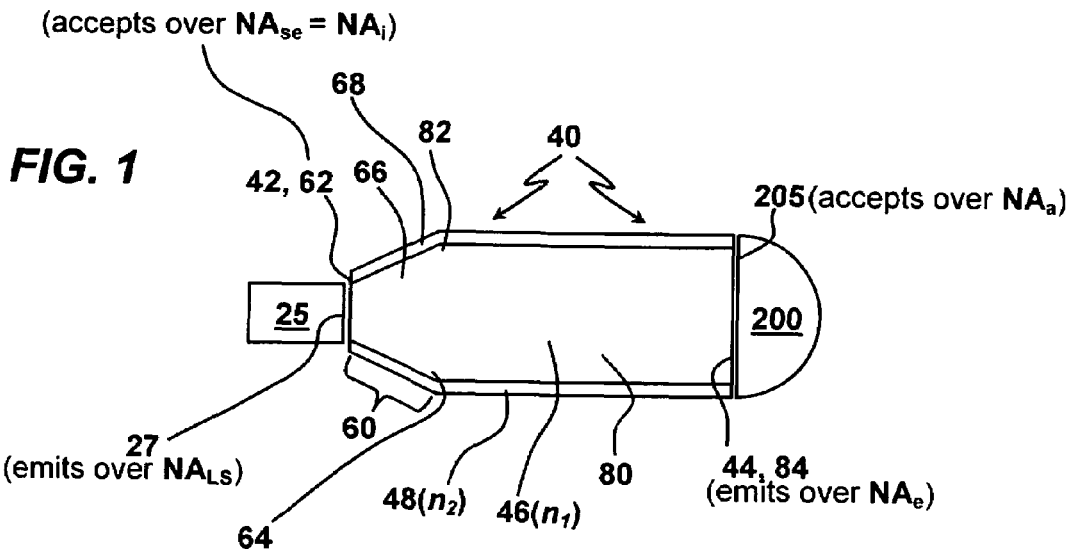
FIG. 1 depicts an illumination assembly including a light-guiding element having an integrally formed alteration taper the small end of which serves as the incident end of the light-guiding element.

Referring to FIG. 1, an illustrative illumination assembly 20 includes a light-emitting element 25 with a light-emitting surface 27 that emits light over a light-source numerical aperture $NA_{LS}$. An elongated light-guiding element 40 includes opposed incident and emission ends 42 and 44. Extending between the incident and emission ends 42 and 44 is a core 46 exhibiting a first refractive index $n_1$ i and a cladding 48 disposed about the core 46 and exhibiting a second refractive index $n_2$ lower than the first refractive index $n_1$ in order to facilitate the propagation of light through the light-guiding element 40 by total internal reflection. Known to those of skill in the relevant arts is that a non-tapered internally-reflecting light conduit formed as described exhibits a numerical aperture the mathematical expression for which is $NA=(n_1^2-n_2^2)^{1/2}$, where $n_1$ represents the refractive index of the core material and $n_2$ represents the refractive index of the cladding material. Within the scope and contemplation of the invention as expressed in this description and the appended claims are versions in which the cladding 48 disposed about the core is a gas or gaseous mixture such as, by way of non-limiting example, air. Alternative versions of the illumination assembly 20 include a light-guiding element 40 with a tapered segment 60 constituting a numerical-aperture alteration taper 60 having small and large ends 62 and 64 and a core portion 66 and clad portion 68 extending between the small and large ends 62 and 64 with relative indices of refraction (e.g., $n_1$ and $n_2$) that facilitate total internal reflection through the alteration taper 60. In the illustrative version of FIG. 1, the light-guiding element 40 includes an alteration taper 60 integrally formed with a relatively non-tapered segment 80 of the light-guiding element 40 and oriented with respect to the non-tapered segment 80 such that the small end 62 of the alteration taper 60 coincides with (e.g., serves as) the incident end 42 of the elongated light-guiding element 40.

The integral alteration taper 60 may be formed as generally described in the summary section of the specification or by any other method. Regardless of the method of formation of the alteration taper 60, the small end 62 of the alteration taper 60 exhibits a small-end numerical aperture $NA_{se}$ corresponding to the light-collecting incident numerical aperture $NA_I$ of the light-guiding element 40. Moreover, for reasons presented in the summary, and otherwise known to the those of ordinary skill in, for example, the optical fiber fabrication arts, the small-end numerical aperture $NA_{se}$ is greater in magnitude than that exhibited by the large-end numerical aperture $NA_{LE}$ and, by extension applicable in the illustrated case, the emission numerical aperture $NA_e$ defined at the emission end 44 of the light-guiding element 40.

Referring still to FIG. 1, the small end 62 (i.e., the incident end 42) is situated in light-collecting proximity with the light-emitting surface 27 of the light-emitting element 25. Light collection efficiency is maximized, in various aspects, by selecting an incident numerical aperture $NA_i$ that is at least as large as the light-source numerical aperture $NA_{LS}$ over which the light-emitting surface 27 emits light. For instance, if the light-emitting element 25 emits over an "emission cone" having a half angle of 80°, then the collection efficiency of various aspects is maximized by selecting a light-guiding element 40 having an incident numerical aperture $NA_i$ indicative of an "acceptance cone" with a half angle of at least 80°, for example.

As shown in FIG. 1, various embodiments further include a light-redirecting optical element 200 (e.g., a refractive element such as a focusing lens or dispersive element OR a reflective element) in light-collecting proximity with the emission end 44 of the light-guiding element 40. The light-redirecting element 200 exhibits an acceptance numerical aperture $NA_a$ indicative of the "cone" angle over which that element 200 accepts light at a light-acceptance surface 205. In analogous fashion to the relationship between the light-source numerical aperture $NA_{LS}$ and the incident numerical aperture $NA_i$ described above, optimization of light-collection and transmission efficiency is facilitated by selecting an acceptance numerical aperture $NA_a$ for the light-redirecting optical element 200 that is at least as large as the emission numerical aperture $NA_e$ exhibited by the emission end 44 of the light-guiding element 40.

Figure 1A:
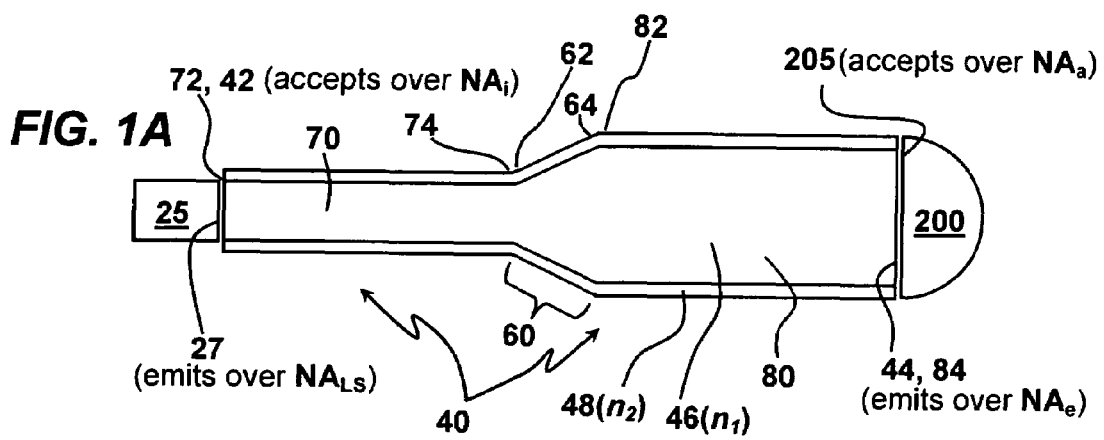
FIG. 1A shows an illumination assembly including a light-guiding element having an alteration taper integrally formed therein such that neither the small or large end of the taper serves as either the incident or emission end of the light-guiding element.
Figure 1B:
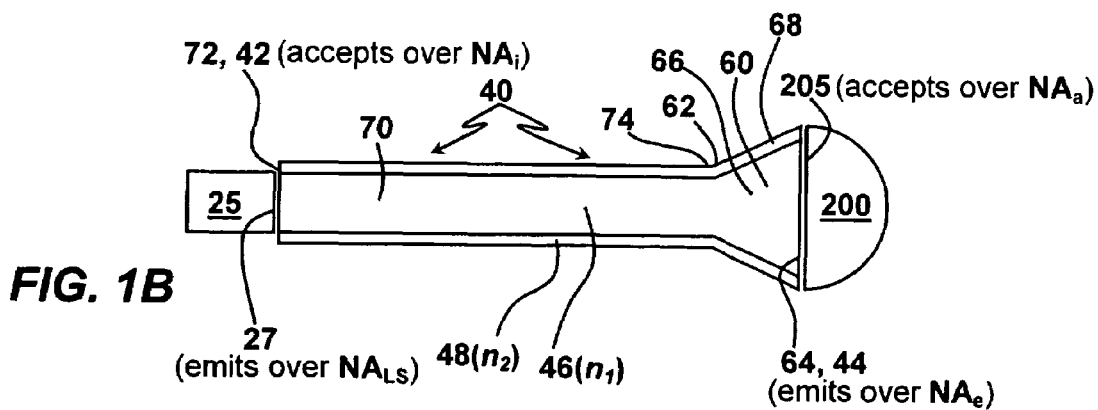
FIG. 1B illustrates an illumination assembly including a light-guiding element having an integrally formed alteration taper the large end of which serves as the emission end of the light-guiding element.

FIGS. 1A and 1B depict alternative versions in which an alteration taper 60 is disposed along a portion of the length of the light-guiding element 40 other than a portion in which the small end 62 of the alteration taper 60 constitutes the incident end 42 of the light-guiding element 40. More specifically, in FIG. 1A, the light-guiding element 40 is fabricated such that both the small and large ends 62 and 64 of the alteration taper 60 are between and distinct from the incident and emission ends 42 and 44 of the light-guiding element 40 and such that the light-guiding element 40 includes first and second relatively non-tapered clad rod segments 70 and 80 of differing diameters and cross-sectional areas. The first non-tapered clad rod segment 70 has primary and secondary ends 72 and 74 and the second non-tapered clad rod segment 80 has first and second ends 82 and 84. The primary end 72 of the first clad rod segment 70 serves as the incident end 42 of the light-guiding element 40 and the second end 84 of the second clad rod segment 80 coincides with the emission end 44 of the light-guiding element 40. The secondary end 74 of the first clad rod segment 70 is integral with the small end 62 of the alteration taper 60, while the first end 82 of the second clad rod segment 80 is integral with the large end 64 of the alteration taper 60.

FIG. 1B shows an embodiment in which the large end 64 of the alteration taper 60 coincides with (i.e., serves as) the emission end 44 of the light-guiding element 40 and the small end 62 of the alteration taper 60 is integral with a non-tapered clad rod segment 70 of the light-guiding element 40. In this illustrative version, the primary end 72 of the clad rod segment 70 is the incident end 42 of the light-guiding element 40 and is displaced from the small end 62 of the alteration taper 60 which is integral with the second end 74 of the clad rod segment 70. In keeping with the explanation previously provided, the incident end 42 has an incident numerical aperture $NA_i$ larger than the emission numerical aperture $NA_e$ due to the inclusion of the alteration taper 60 along a portion of the length of the light-guiding element 40.

Figure 2:
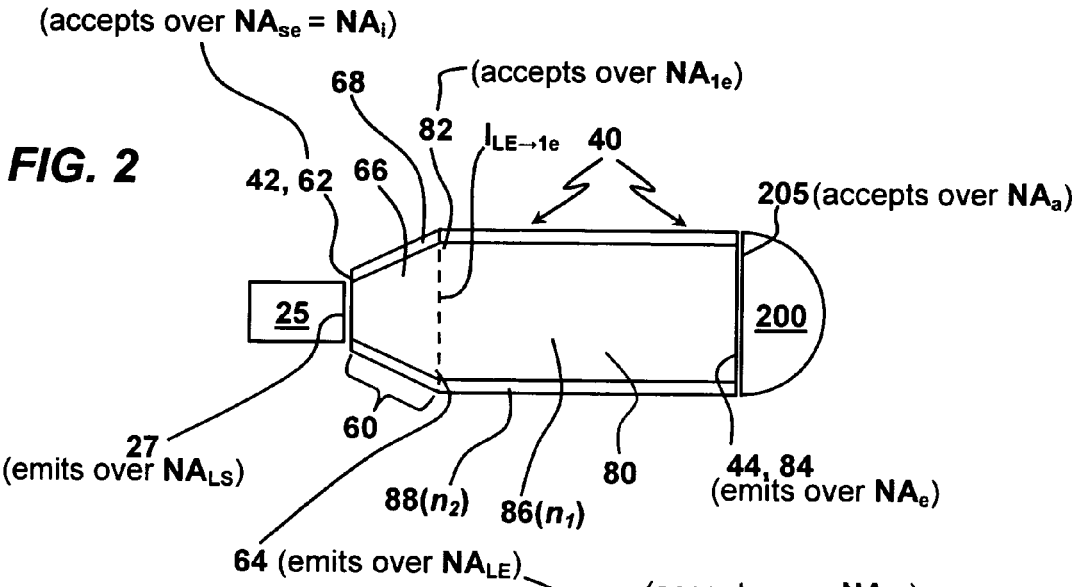
FIGS. 2, 2A and 2B depict versions structurally analogous to those of, respectively, FIGS. 1, 1A and 1B, wherein, instead of being integrally included along the length of a light-guiding element, a discrete alteration taper is joined with, as applicable, at least one relatively non-tapered clad-rod segment in order to form a light-guiding element defining an optical train.
Figure 2A:
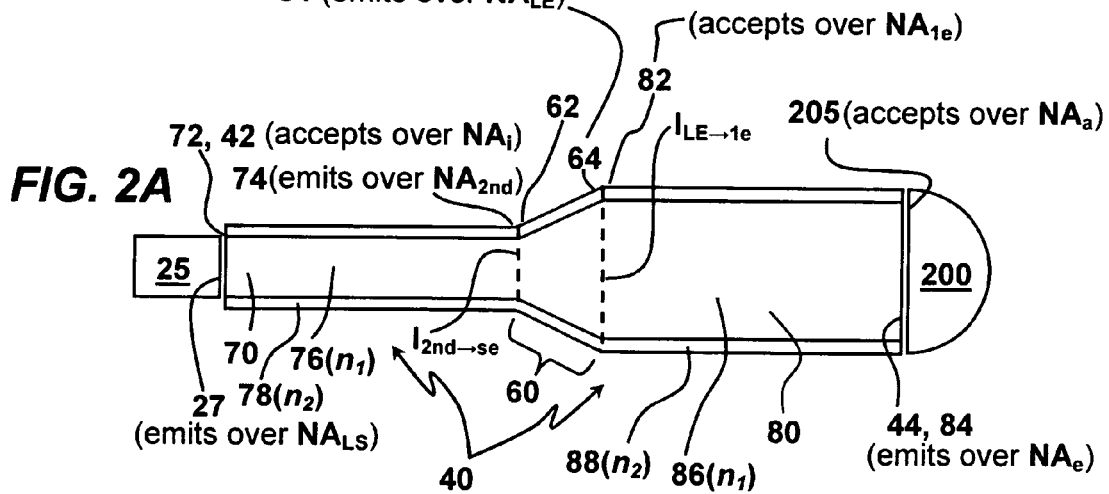
Figure 2B:
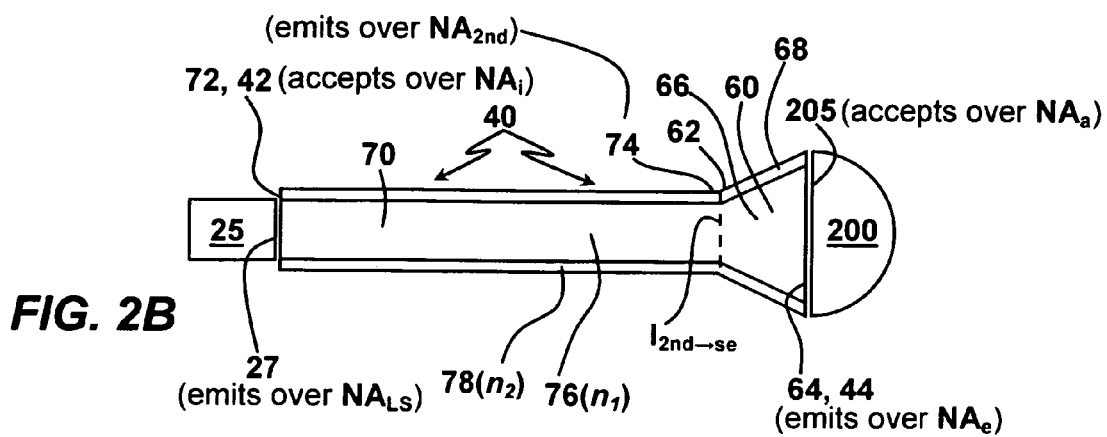

In the illustrative versions of FIGS. 1, 1A and 1B, an alteration taper 60 is integrally formed with at least one relatively non-tapered segment 70 and/or 80 to define the light-guiding element 40. FIGS. 2, 2A and 2B depict light-guiding elements 40 fabricated by joining through, for example, heat fusion or appropriate adhesive, plural sub-elements to form light-guiding elements 40 corresponding to the configurations represented in, respectively, FIGS. 1, 1A and 1B. In the illustrative illumination assembly of FIG. 2, for example, the light-guiding element 40 includes an alteration taper 60 having small and large ends 62 and 64 and a length of relatively non-tapered clad light conduit including first and second ends 82 and 84, an optical core 86 and an optical cladding 88 and constituting a relatively non-tapered clad rod segment 80 of the light-guiding element 40. The large end 64 of the alternation taper 60 is joined in abutting, sequential relationship with the first end 82 of the relatively non-tapered clad rod segment 80. In accordance with previous discussion, the relatively non-tapered clad rod segment 80 has a numerical aperture given by $NA=(n_1^2-n_2^2)^{1/2}$ where $n_1$ represents the refractive index of the core 86 and $n_2$ represents the refractive index of the cladding 88. Moreover, the small and large ends 62 and 64 of the alteration taper 60 exhibit differing small-end and large-end numerical apertures $NA_{se}$ and $NA_{LE}$. The joining of the large end 64 of the alteration taper 60 to the first end 82 of the clad rod segment 80 introduces an optical interface $I_{LE \to 1e}$ at which the alteration taper 60 presents a large-end numerical aperture $NA_{LE}$ and the clad rod segment 80 presents a first-end numerical aperture $NA_{1e}$. The optimization of transmission efficiency through the light-guiding element 40 is facilitated by selecting large-end and first-end numerical apertures $NA_{LE}$ and $NA_{1e}$ that are compatible such that the quantity of light that exits the large end 64 of the alteration taper 60 and is introduced into the first end 82 of the clad rod segment 80 is maximized. In various versions, light-transfer efficiency at the aforementioned interface $I_{LE \to 1e}$ is facilitated by selecting a clad rod segment 80 exhibiting a first-end numerical aperture $NA_{1e}$ that is at least as large as the large-end numerical aperture $NA_{LE}$ presented to the first end 82. As shown in FIG. 2, the joined tapered and relatively non-tapered sub-elements 60 and 80 combine to form a light-guiding element 40 in which the small end 62 of the alteration taper 60 serves as the incident end 42 and the second end 84 of the clad rod segment 80 serves as the emission end 44. In other material respects, the version of FIG. 2 is analogous to that of FIG. 1 and, therefore, like elements in the respective figures are identified by like reference characters.

Referring to the version of FIG. 2A, an alternative illumination assembly 20 is analogous to that of FIG. 1A. The primary difference between the versions of FIGS. 1A and 2A is that the light-guiding element 40 of FIG. 1A, like that of FIG. 1, includes an alteration taper 60 integrally formed with a relatively non-tapered clad rod segment 80 whereas the light-guiding element 40 of FIG. 2A, like that of FIG. 2, includes a discrete alteration taper 60 that is joined, in this case, to first and second relatively non-tapered clad rod segments 70 and 80. The first and second relatively non-tapered clad rod segments 70 and 80 include, respectively, primary and secondary ends 72 and 74 and first and second ends 82 and 84. The first clad rod segment 70 includes an optical core 76 and an optical cladding 78 with relative refractive indices $n_1$ and $n_2$ selected such that light propagates therethrough by total internal reflection. The refractive index $n_1$ associated with the core 76 may, in alternative versions, be equal to or different from the refractive index $n_1$ associated with the core 86. Similarly, the refractive index $n_2$ of the cladding 78 may be the same or different from the refractive index $n_2$ of the cladding 88. The first clad rod segment 70 is smaller in cross-section than the second clad rod segment 80 and is more proximate the light-emitting element 25 than the second clad rod segment 80. In the arrangement of FIG. 2A, the primary end 72 of the first clad rod segment 70 coincides with the incident end 42 of the light-guiding element 40 while the second end 84 of the second clad rod segment 80 corresponds to the emission end 44 of the light-guiding element 40. Along the length of the light-guiding element 40, a first optical interface $I_{2nd \to se}$ is present where the secondary end 74 of the first clad rod segment 70 is joined with the small end 62 of the alteration taper 60 and a second optical interface $I_{LE \to 1e}$ is present where the large end 64 of the alternation taper 60 is joined with the first end 82 of the second clad rod segment 80. In various versions, the small-end numerical aperture $NA_{se}$ is selected such that it is not lesser in magnitude than the secondary-end numerical aperture $NA_{2nd}$ at the secondary end 74 of the first clad rod segment 70. Similarly, the large-end numerical aperture $NA_{LE}$ in various embodiments is selected such that it is lesser in magnitude than the first-end numerical aperture $NA_{1e}$ of the second clad rod segment 80. In other material respects, the version of FIG. 2A is analogous to that of FIG. 1A and, therefore, like elements in these respective figures are identified by like reference characters.

Referring to FIG. 2B, a light-guiding element 40 includes an alteration taper 60 having small and large ends 62 and 64 and a length of relatively non-tapered clad light conduit including first and second ends 72 and 74, an optical core 76 and an optical cladding 78 and constituting a relatively non-tapered clad rod segment 70 of the light-guiding element 40. The illustrative version of FIG. 2B is analogous to that FIG. 1B and exhibits elements in common with the version of FIG. 2B. More specifically, the light-guiding element 40 of FIG. 1B, like those of FIGS. 1 and 1A, includes an alteration taper 60 integrally formed with at least one relatively non-tapered clad rod segment (i.e., 80, in FIG. 1, and 70 and 80 in FIG. 1A) whereas the light-guiding element 40 of FIG. 2A, like that of FIGS. 2 and 2A, includes a discrete alteration taper 60 that is secured to at least one relatively non-tapered clad rod segment (i.e., 80, in FIG. 2, and 70 and 80 in FIG. 1A). The illustrative light-guiding element 40 of FIG. 2B is like the version of FIG. 2A sans the second clad rod segment 80. Accordingly, unlike the version of FIG. 2A, in the version of FIG. 2B, the light-redirecting element 200 is situated in light-collecting proximity with the large end 64 of the alteration taper 60 and, because the version of FIG. 2B lacks a second clad rod segment 80, there is no optical interface $I_{LE \to 1e}$ present where the large end 64 of the alternation taper 60 is joined with the first end 82 of a second clad rod segment 80 as in FIG. 2A. To the extent that the version of FIG. 2B is analogous to those of FIGS. 1B and 2A, like elements in these respective figures are identified by like reference characters and, therefore, the descriptive discussion of a particular element referenced by number in connection with one version is regarded as a description of the analogous element referenced by the same number in another version.

Figure 3:
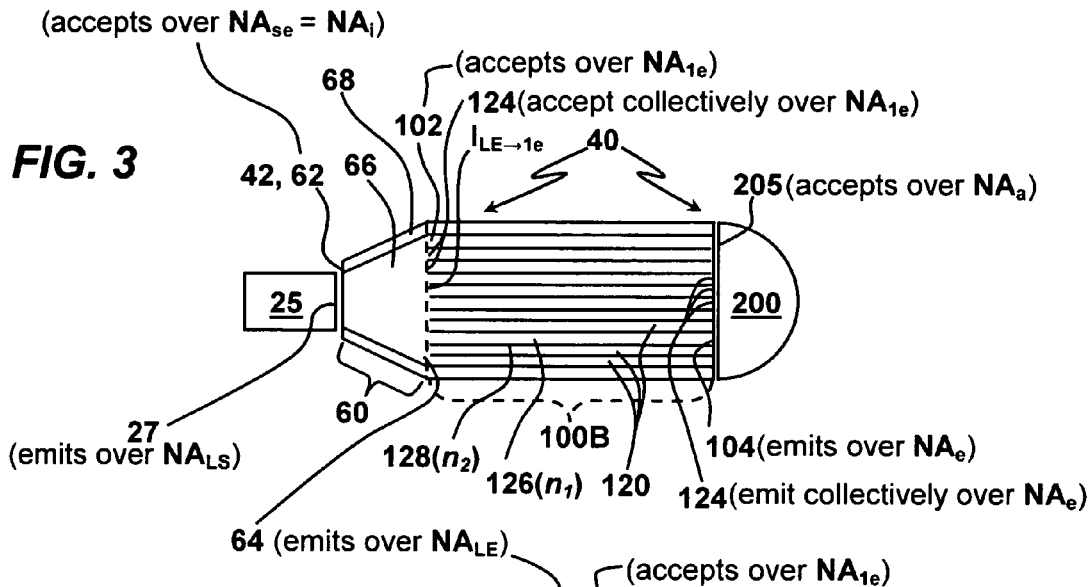
FIGS. 3, 3A and 3B depict versions structurally analogous to those of, respectively, FIGS. 2, 2A and 2B, wherein, instead of a clad-rod segment, a discrete alteration taper is joined with, as applicable, at least one relatively non-tapered segment in the form of an elongated light-guiding bundle of at least two adjacently abutting (e.g. clad-to-clad) light-guiding constituent elements.
Figure 3A:
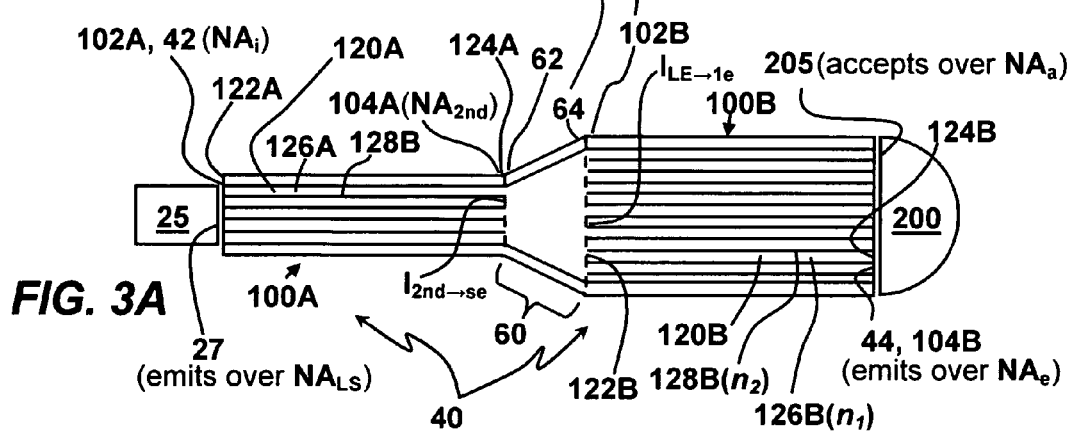
Figure 3B:
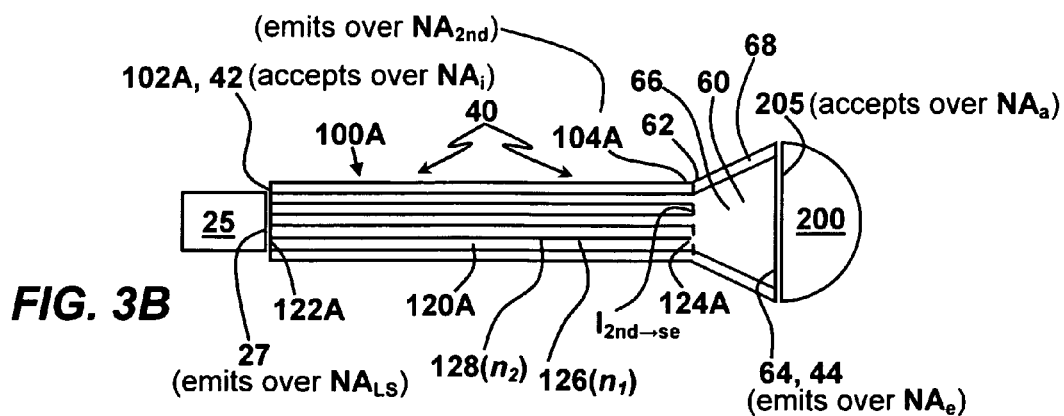

In still another set of embodiments exemplified by FIGS. 3, 3A and 3B, a light-guiding element 40 includes an alteration taper 60 wherein at least one of the small end 62 and the large end 64 is in optical alignment with an elongated light-guiding bundle 100 (i.e., at least one of a first bundle 100A and a second bundle 100B). As a preliminary point of clarification with reference to the illustrative embodiments of FIGS. 3 to 3B, each of bundles 100A and 100B may be alternatively referenced in this description without the designation "A" or "B" as context may indicate such as, for example, when general features or characteristics applicable to either of bundles 100A and 100B are under consideration. Similarly, sub-elements (e.g. constituent elements 120, etc.) of the bundles 100A and 100B may be referenced sans the designation "A" or "B." The designations "A" and "B" serve to indicate to which of bundles 100A and 100B a particular sub-element belongs. Accordingly, a reference to "sub-elements 120," for example, may be, where applicable in accordance with context, a simultaneous reference to sub-elements 120A and 120B of, respectively, bundles 100A and 100B or, in an embodiment in which only one of bundles 100A and 100B is present, the applicable sub-element(s) 120A or 120B belonging to the applicable one of bundles 100A and 100B that is present in that particular embodiment.

Each of bundles 100 comprises at least two adjacently abutting (e.g. clad-to-clad) light-guiding constituent elements 120 each of which constituent elements 120 comprises an optical core 126 having a first refractive index $n_1$ surrounded, at least along a portion of the core length, by a cladding material 128 of a second refractive index $n_2$ lower in magnitude than the first refractive index $n_1$ of the core 126 such that light propagates by total internal reflection from a first end 122 through a second end 124 of the constituent element 120. The bundle 100 itself has first and second ends 102 and 104 which coincide with, respectively, the first and second ends 122 and 124 of the constituent elements 120. Known to those of ordinary skill in the relevant arts is that such a light-guiding bundle 100 can be caused to exhibit a "collective" or "effective" numerical aperture and emits light collected at one end from the opposite end in a manner very closely approximating the manner in which light collected and emitted from opposed ends of a cladded single-core light pipe of similar dimensions such as, by way of example, the relatively non-tapered clad rod segments 70 and 80 discussed above. For example, as the number of light-guiding constituent elements 120 becomes very large, and the cross-sectional area of each one becomes very small, the bundled constituent elements 120 approximate a single-core clad rod in a manner conceptually analogous to the manner in which the continuous area under a curve can be very accurately approximated by a large number of small-area rectangles. Extending the conceptual analogy, a single-core clad rod behaves, in many material respects, like an infinite number of infinitesimal light-guiding constituent elements 120, at least in terms of numerical aperture. The light-guiding elements 40 of the illustrative illumination assemblies of FIGS. 3, 3A and 3B correspond by analogy to the light-guiding elements 40 shown in, respectively, FIGS. 2, 2A and 2B. The difference in each case is that the relatively non-tapered clad rod segments 70 and 80 in FIGS. 2, 2A and 2B are supplanted in the versions of, respectively, FIGS. 3, 3A and 3B with, where applicable, a bundle 100 or first and second bundles 100A and 100B. Accordingly, to the extent that numbered elements, interfaces and numerical apertures, for example, associated with the versions in FIGS. 3, 3A and 3B are analogous to numbered elements, interfaces and numerical apertures in the versions of, respectively, FIGS. 2, 2A and 2B, like reference characters are used. Moreover, to the extent that sufficient analogousness exists between the versions of, respectively, FIGS. 2 and 3, 2A and 3A and 2B and 3B, and explicit descriptive language in association with aspects of FIGS. 3, 3A, and 3B is lacking, the detailed description of the like aspects of FIGS. 2, 2A and 2B is regarded as descriptive of such aspects in FIGS. 3, 3A and 3B.

Referring to FIGS. 4A through 7B, various alternative illumination assemblies 20 incorporate a light-conduction assembly 150 including a plurality of at least two light-guiding elements 40 such as those light-guiding elements 40 depicted in any of FIGS. 1 through 3B. In various illumination assemblies comprising a plurality of at least two light-guiding elements 40, the light-guiding elements 40 are alternatively referred to as "light-guiding branch elements 40" or, simply, "branch elements 40." Various alternatively configured "multi-branch" illumination assemblies 20 are described in subsequent paragraphs in conjunction with the respective drawings referenced therein. It is to be understood that in each illustrative instance, the branch elements 40 are "rigid" as that term was defined in the summary.

Figure 4A:
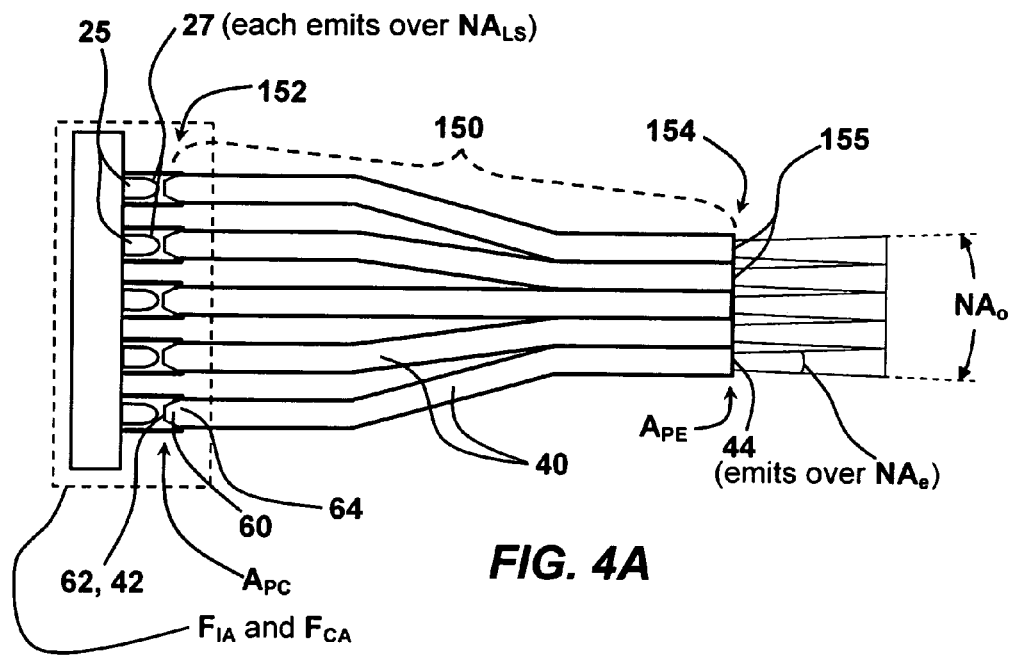
FIG. 4A is of an illumination assembly including a light-conduction assembly comprising a plurality of bent elongated light-guiding branch elements that guide light from a planar collection-array format to a planar output-array format in which the emission points at the output are more densely arranged than the incident points at the input.

Referring to FIG. 4A, one illustrative illumination assembly 20 includes a plurality of light-emitting elements 25 each of which includes a light-emitting surface 27 that emits light over a light-source numerical aperture $NA_{LS}$. The light-emitting elements 25 are spatially arranged in accordance with a predetermined illumination-array format $F_{IA}$. Although, as described in the summary section of the specification, the light-emitting elements 25 are alternatively arranged in various two-dimensional planar formats or in curved-surface formats, for example, in the illustrative version of FIG. 4A, the light-emitting elements 25 are arranged in a 5×5 array as viewed primarily from the side (i.e., perpendicularly to the axes of the branch elements 40.

Figure 4B:
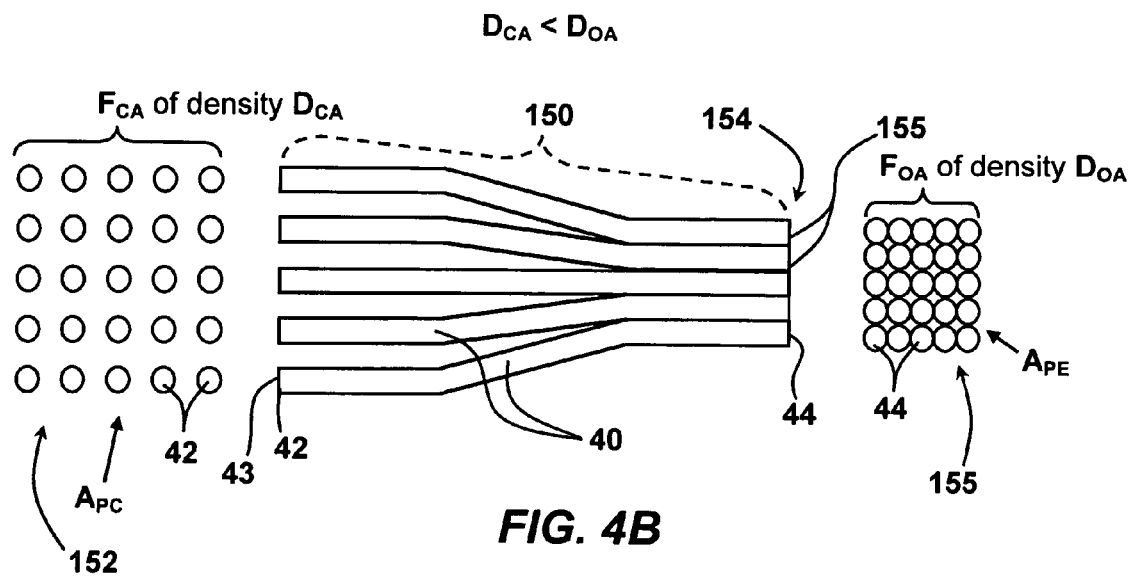
FIG. 4B schematically depicts input, side and output views of the light-conduction assembly of the illumination assembly depicted in FIG. 4A.

The illumination assembly 20 includes a light-conduction assembly 150 having a collection end 152 (alternatively, input end 152), an output end 154 and at least one elongated light-guiding branch element 40 corresponding to each light-emitting element 25. Each elongated light-guiding branch element 40 may be of any of the general configurations described above in association with FIGS. 1 through 3B, for example. However, for purposes of illustration and explanation, the light-guiding branch elements 40 of FIG. 4A and FIG. 4B, and the drawings of multi-branch illumination assemblies 20 more generally, are of the general form of light-guiding element 40 represented in FIGS. 1 and 2 in which the small end 62 of an alteration taper 60 serves as the incident end 42 of the branch element 40, unless explicitly noted or otherwise implied by context. For purposes of clarity in some of the drawings, however, the taper(s) 60 of individual branch elements 40 are omitted since their explicit inclusion in various drawings is not material to the comprehension of the configurative aspects under consideration in the drawings in which they are not depicted. The branch elements 40 are secured in mutually-fixed relationship such that the incident ends 42 of the branch elements are retained in spaced-apart relationship at the collection end 152 of the light-conduction assembly 150 in accordance with a predetermined collection-array format $F_{CA}$ exhibiting a collection-array density $D_{CA}$, as shown in FIG. 4B. The arrangement of incident ends 42 corresponds to the spatial arrangement of light-emitting elements 25.

Figure 4C:
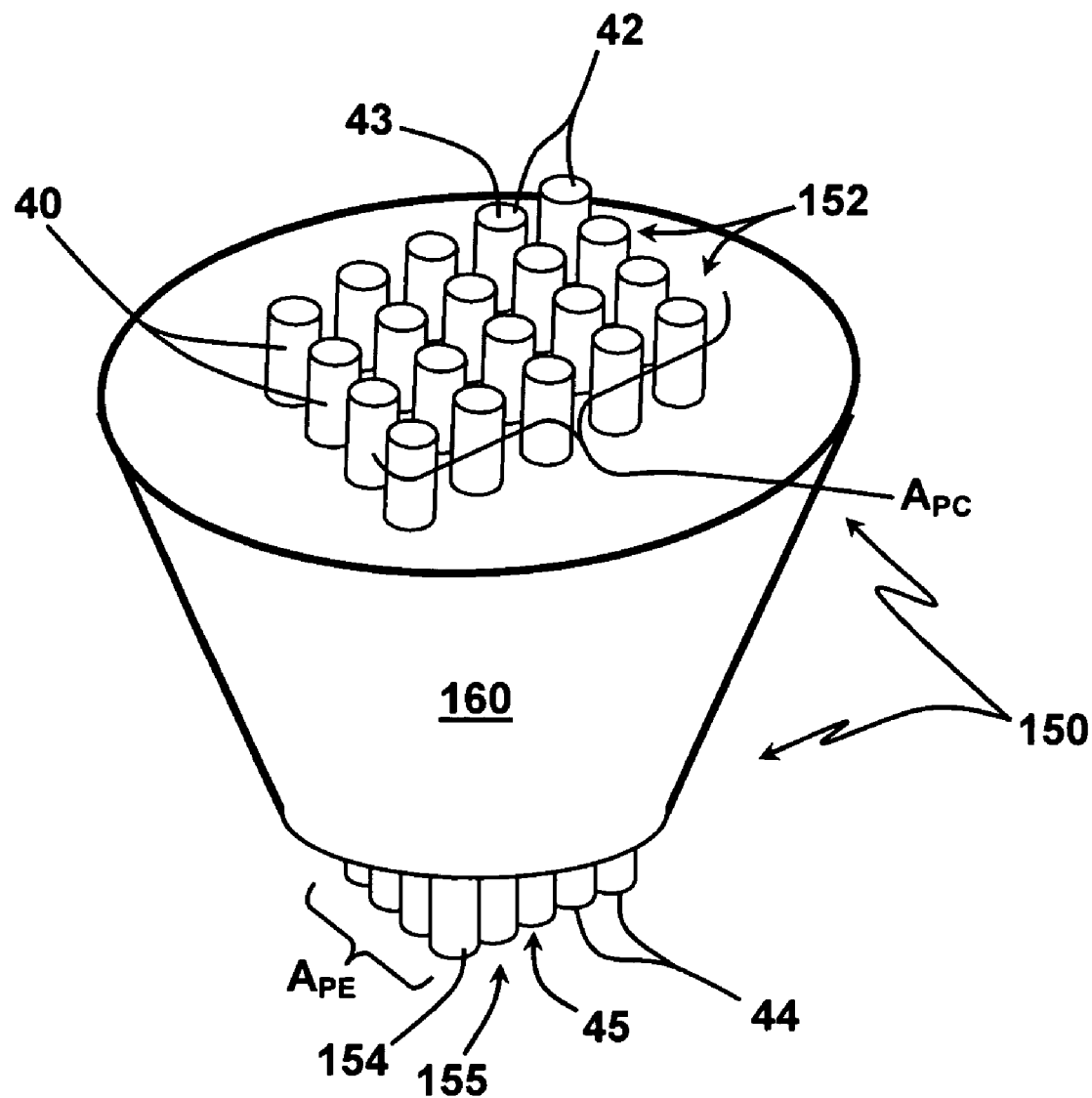
FIG. 4C shows a light-conduction assembly in which plural light-guiding branch elements are protected and maintained in mutually fixed spatial relationships by a housing of plastic or other injectable polymeric material that fills interstices among the branch elements.

Referring to FIGS. 4A and 4B, the emission ends 44 of the branch elements 40 coincide with the output end 154 of the light-conduction assembly 150 and are fixedly retained in accordance with a predetermined output-array format $F_{OA}$ exhibiting an output-array density $D_{OA}$ that is denser than the collection-array density $D_{CA}$. In many versions, the emission ends 44 of the branch elements 40 are adjacently fused or otherwise secured (e.g., bonded by an epoxy or other selectively curable adhesive for example) in contacting relationship such that their collective emission ends 44 form a continuous output face 155 that emits light collected from the plural light-emitting elements 25 over a collective output numerical aperture $NA_O$. Alternatively, or in addition, various light-guiding branch elements 40 are retained in mutually fixed spatial relationship by an injection molding process according to which a plastic or other polymeric material is injected or otherwise introduced to fill any interstices between and among the branch elements 40 in the light-conduction assembly 150. An illustrative example of such a light-conduction assembly is shown in FIG. 4C in which a plurality of 20 (i.e., a 4×5 array) branch elements 40 is retained by an injection molded housing 160. Advantages of such a housing 160 include (i) protection of the branch elements 40 from mechanical damage, (ii) simplified coupling to a fixed, complimentary array of light-emitting elements 25, and (iii) modularity of the light-conduction assembly 150.

In the illustrative light-conduction assemblies 150 of FIGS. 4A through 4C, the collection-array format $F_{CA}$ is such that the incident faces 43 of the incident ends 42 of the light-guiding branch elements 40 define a planar collection array $A_{PC}$. Similarly, the emission faces 45 of the emission ends 44 define a planar emission array $A_{PE}$ at the output face 155 at the common output end 154. Moreover, each branch element 40 of a selected set of branch elements 40 is bent between the incident and emission ends 42 and 44 in order to render the output-array density $D_{OA}$ denser than the collection-array density $D_{CA}$.

Figure 5:
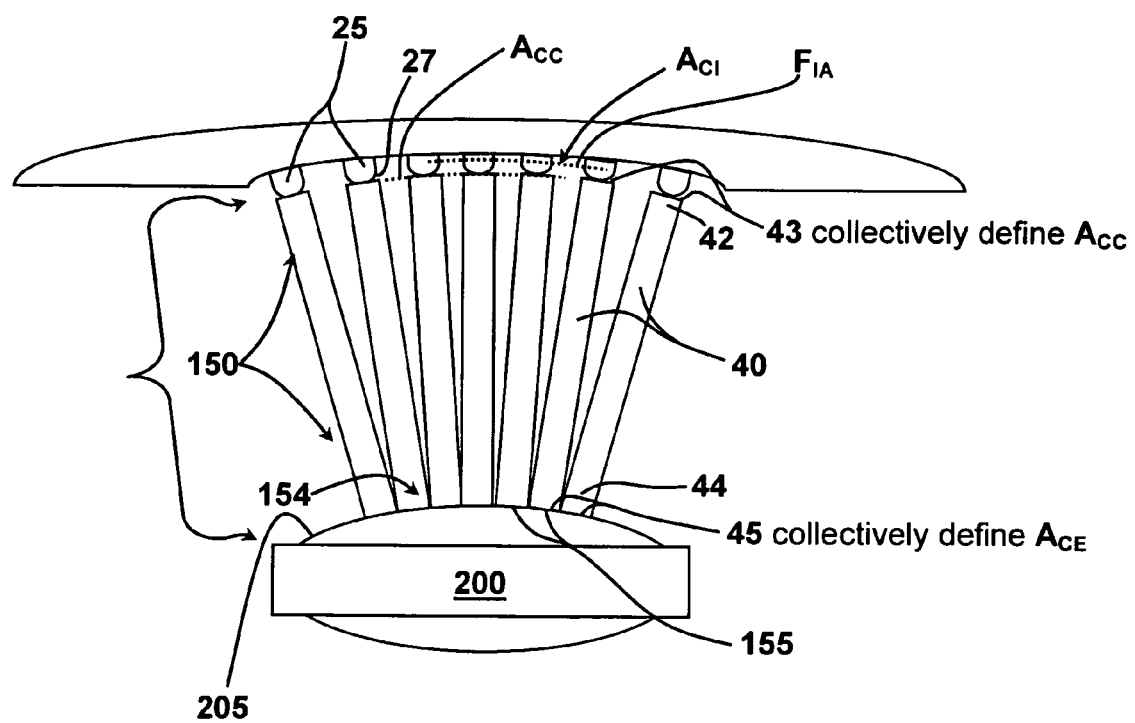
FIG. 5 shows an illumination assembly including a light-conduction assembly comprising a plurality of non-bent elongated light-guiding branch elements that guide light from a curved collection-array format to a curved output-array format in which the emission points at the output are more densely arranged than the incident points at the input.

Referring to FIG. 5, an alternative light-conduction assembly 150 includes a plurality of non-bent (i.e., not intentionally bent) branch elements 40. In order to render the output-array density $D_{OA}$ denser than the collection-array density $D_{CA}$ in this illustrative version, the branch elements 40 are fixedly retained such that they mutually converge toward the common output end 154 of the light-conduction assembly 150. Moreover, in the illustrative version of FIG. 5, the incident faces 43 of the branch elements 40 define a curved collection array $A_{CC}$ and the emission faces 45 define a curved emission array $A_{CE}$ at a curved output face 155. The illumination-array format $F_{IA}$ is such that the light-emitting elements 25 define a curved illumination array $A_{CI}$ corresponding in curvature to the curvature of the curved collection array $A_{CC}$. The concave curvature of the output face 155 compliments (i.e., corresponds to) the convex curvature of the light-acceptance surface 205 of a light-redirecting element 200 with which the output face 155 is in contacting engagement. In the particular embodiment of FIG. 5, light-collection and transmission efficiency is facilitated by aligning the axes (not labeled) of the light-guiding branch elements 40 such that they are normal to the light-acceptance surface 205 of the light-redirecting element 200 and such that the light-emitting elements 25 are axially aligned with the incident faces 43 of the branch elements 40.

As explained in connection with the description of individual light-guiding elements 40 associated with the illustrative embodiments of FIGS. 1 through 3B, light-collection and light-transmission efficiencies are optimized in some versions by selecting at various emitting-accepting couplings or optical interfaces an acceptance numerical aperture that is not lesser in magnitude than the numerical aperture over which the light-supplying side of the interface emits light. Where the emission faces 45 of plural branch elements 40 combine to form a continuous output face 155 at the common output end 154 of the light-conduction assembly, irrespective of whether that output face 155 is planar, as in FIGS. 4A through 4C, or curved, as in FIG. 5, various versions are such that the light-accepting numerical aperture $NA_a$ of the light-redirecting element 200 is not lesser in magnitude than the output numerical aperture $NA_O$ of the light-conduction assembly 150 at the output face 155.

Figure 6A:
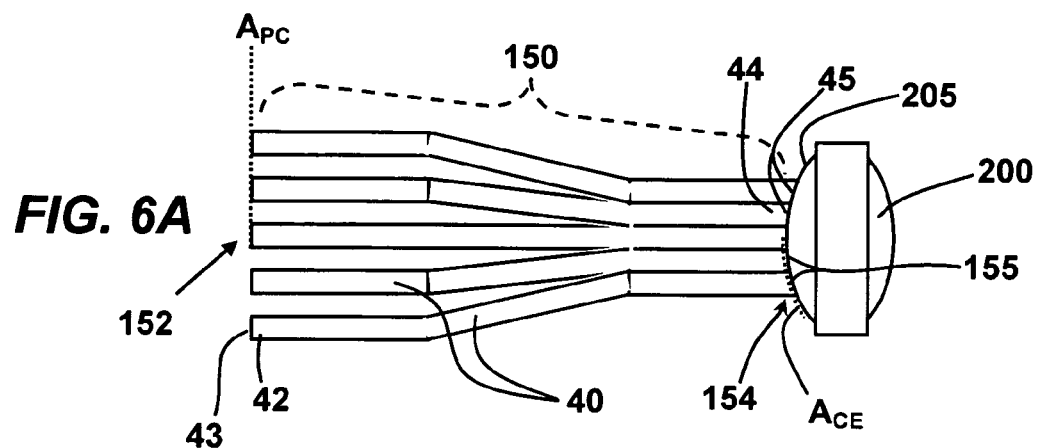
FIGS. 6A and 6B depict alternative variations each of which includes bent light-guiding branch elements terminating at emission faces that combine to define a curved continuous output face.
Figure 6B:
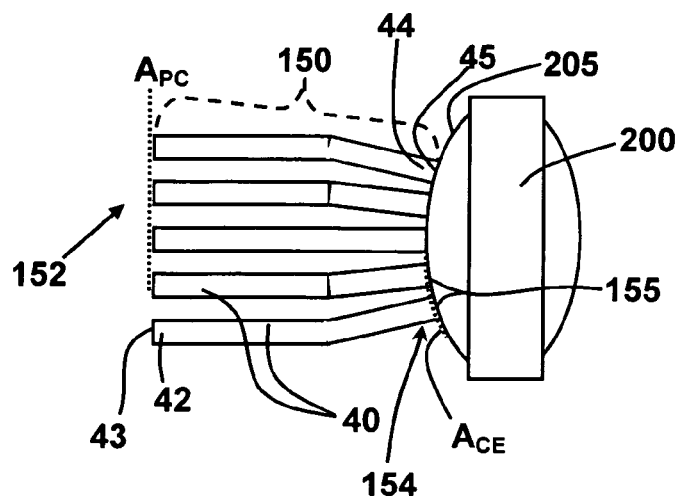

FIGS. 6A and 6B depict still additional illustrative, non-limiting variations within the general scope and contemplation of the invention as expressed in the appended claims. Each version includes bent light-guiding branch elements 40 terminating at emission faces 45 that define a curved continuous output face 155. Moreover, in each instance, although the light-emitting elements are not shown, the branch elements 40 are secured in mutually-fixed relationship such that the incident ends 42 of the branch elements 40 are retained in spaced-apart relationship at the collection end 152 of the light-conduction assembly 150 with the incident ends 42 thereof defining a generally planar collection array $A_{PC}$ akin to the planar collection array format $A_{PC}$ shown in the incident-end view portion of FIG. 4B. In the version of FIG. 6A, each branch element 40 of a selected set of branch elements 40 (i.e., all but the central branch element 40 in the array) is twice bent such that a first portion along the length of that branch element 40 beginning at the incident end 42 thereof is parallel with corresponding portions of neighboring branch elements 40 and such that a second portion along the length of that branch element 40 beginning at the emission end 44 thereof is parallel with corresponding portions of neighboring branch elements 40. In this version, the emission end 44 of each branch element 40 is minutely curved in order to compliment the localized curvature of the light-acceptance surface 205 of the light-redirecting element 200 and contribute infinitesimally to the overall concave curvature of the output face 155 of the light-conduction assembly 150. In contrast, the version of FIG. 6B is such that each branch element 40 of a selected set of branch elements 40 is once bent with a portion of each branch element 40 beginning at the emission end 44 having its axis (not labeled) normal to the convex light-acceptance face 205 of the light-redirecting element 200.

Although not expressly shown, it is to be appreciated that alternative versions including, for example, twice bent branch elements 40 exhibiting a curved collection-array format $F_{CA}$ at curved collection array $A_{CC}$ terminating at and defining a curved output face 155 are also within the scope and contemplation of the appended claims.

Figure 7A:
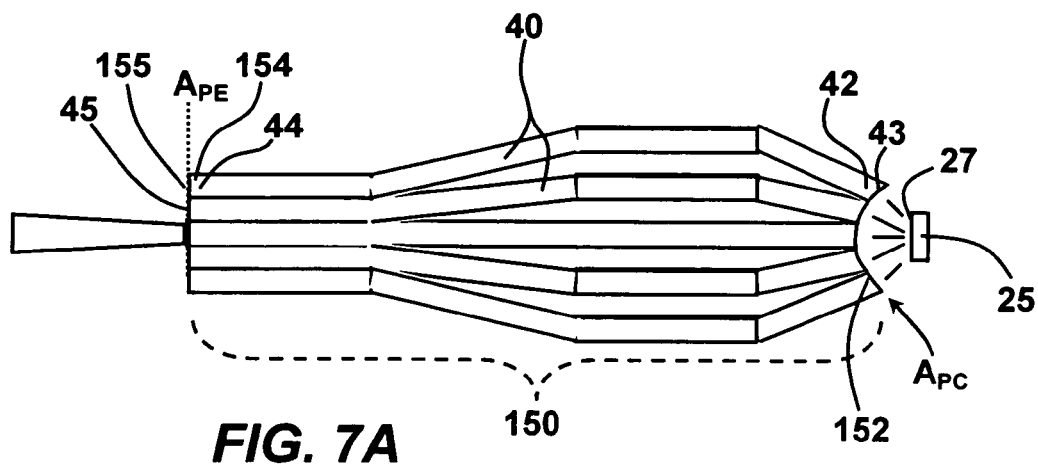
FIGS. 7A and 7B show alternative versions of an illumination assembly in which plural light-guiding branch elements of a light-conduction assembly collect light from a single light-emitting element corresponding to the light-conduction assembly.
Figure 7B:
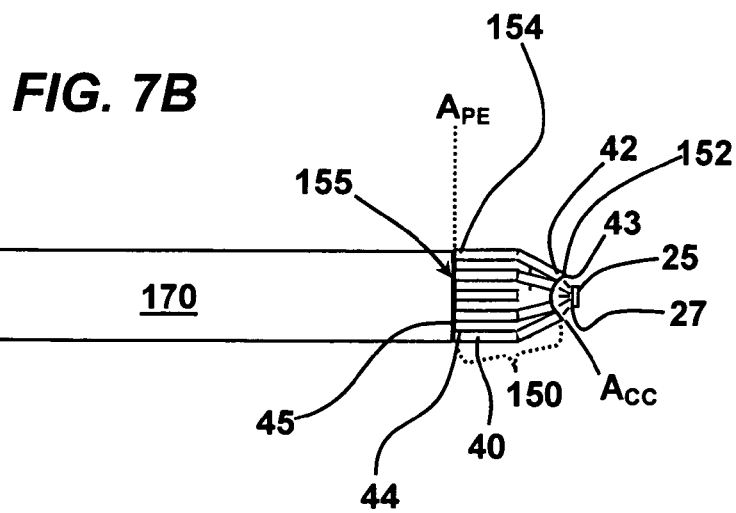

Although implicitly within the scope of the claims are versions in which at least two branch elements 40 are aligned to collect light from the same light-emitting element 25, FIGS. 7A and 7B show two illustrative, non-limiting configurations of such versions. More specifically, FIG. 7A depicts a light-conduction assembly 150 having plural bent branch elements 40. Each bent branch element 40 includes a portion beginning at the incident end 42 that is axially aligned with an emitted light ray emitted from the light-emitting element 25. For instance, in such a version, if the light-emitting element 25 emits in a spherical pattern, the incident ends 42 of the branch elements 40 are aligned in a configuration representing a portion of a sphere concentric about a point back to which rays representing light emitted from the light-emitting element 25 are traceable. In the version of FIG. 7A, portions of plural branch elements 40 beginning at the output face 155 of the light-conduction assembly 150 are mutually parallel and terminate so as to define a planar output face 155. The illustrative configuration of FIG. 7B includes elements in common with that of FIG. 7A in addition to a mixing tunnel 170 in which the light emitted from the emission ends 44 of the plural branch elements 40 is "mixed" and integrated in order to provide a more uniform output. Equally implicit, although not shown, are versions in wherein plural light-emitting elements 25 emit light collected by a single light-guiding element 40.

The foregoing is considered to be illustrative of the principles of the invention. Furthermore, since modifications and changes to various aspects and implementations will occur to those skilled in the art without departing from the scope and spirit of the invention, it is to be understood that the foregoing does not limit the invention as expressed in the appended claims to the exact constructions, implementations and versions shown and described.

What is claimed is:

1. An illumination assembly comprising:
   at least one light-emitting element; and
   a light-conduction assembly including a common output end and a plurality of at least two light-guiding branch elements, each light-guiding branch element including an incident end and an emission end and being rigid over the entire length thereof between the incident and emission ends;
   wherein (a) each incident end exhibits an incident face to at least one of the at least one light-emitting elements and the emission end includes an emission face coinciding with the common output end of the light-conduction assembly; (b) at least one of the at least two rigid light-guiding branch elements includes along a portion of its length a numerical-aperture alteration taper having opposed small and large ends exhibiting, respectively, a small-end numerical aperture and a large-end numerical aperture lower in magnitude than the small-end numerical aperture; (c) the alteration taper is oriented such that the small end is more proximate the incident end of the light-guiding element than the large end; and (d) the rigid light-guiding branch elements are secured in mutually-fixed relationship such that
      (i) the incident ends of the light-guiding branch elements are retained in fixed spatial relationship in accordance with a predetermined collection-array format exhibiting a collection-array density, and
      (ii) the emission ends of the light-guiding branch elements are retained in accordance with a predetermined output-array format exhibiting an output-array density more dense than the collection-array density.

2. The illumination assembly of claim 1 wherein:
   (i) the at least one light-emitting element comprises a plurality of at least two light-emitting elements arranged in fixed, spaced-apart relationship in accordance with a predetermined illumination-array format;
   (ii) the light-conduction assembly includes a light-guiding branch element corresponding to each light-emitting element; and
   (iii) the incident ends of light-guiding branch elements are retained in spaced-apart relationship in accordance with a predetermined collection-array format corresponding to the fixed, spaced-apart arrangement of plural light-emitting elements.

3. The illumination assembly of claim 2 wherein the emission ends of the light-guiding branch elements are secured in contacting relationship such that their emission ends collectively form a continuous output face that emits light collected from the plural light-emitting elements over a collective output numerical aperture.

4. The illumination assembly of claim 3 wherein the continuous output face formed by the collective emission ends is one of (i) planar and (ii) curved.

5. The illumination assembly of claim 3 wherein at least one of the light-emitting elements is a light-emitting diode.

6. The illumination assembly of claim 1 wherein (i) the emission ends of the light-guiding branch elements are secured in contacting relationship such that their emission ends collectively form a continuous output face that emits light collected from the plural light-emitting elements over a collective output numerical aperture and (ii) the continuous output face formed by the collective emission ends is one of (a) planar and (b) curved.

7. The illumination assembly of claim 6 wherein:
   (i) the at least one light-emitting element comprises a plurality of at least two light-emitting elements arranged in fixed, spaced-apart relationship in accordance with a predetermined illumination-array format;
   (ii) the light-conduction assembly includes a light-guiding branch element corresponding to each light-emitting element;
   (iii) the incident ends of light-guiding branch elements are retained in spaced-apart relationship in accordance with a predetermined collection-array format corresponding to the fixed, spaced-apart arrangement of plural light-emitting elements; and
   (iv) the collection-array density is less dense than the output-array density.

8. The illumination assembly of claim 7 wherein at least one of the light-emitting elements is a light-emitting diode.

9. The illumination assembly of claim 1 wherein at least one of the light-guiding branch elements that includes a numerical-aperture alternation taper further includes along a portion of its length a light-conducting segment that is relatively non-tapered with respect to the alteration taper and which has a first end and a second end, and wherein (i) one of the first and second ends is connected to one of the small end and the large end of the alteration taper and the other of the first and second ends coincides with one of the incident and emission ends of the light-guiding branch element and (ii) the relatively non-tapered segment comprises one of (a) a clad rod segment through which light propagates by total internal reflection and (b) a light-guiding bundle of at least two adjacently abutting light-guiding constituent elements through each of which constituent elements light propagates by total internal reflection.

10. A light-conduction assembly comprising a common output end and a plurality of at least two light-guiding branch elements, each light-guiding branch element including an incident end and an emission end;
    wherein (a) each light-guiding branch element is rigid over the entire length thereof between the incident and emission ends, (b) each incident end includes a light-collecting incident face and the emission end includes an emission face coinciding with the common output end of the light-conduction assembly; (c) at least one of the at least two rigid light-guiding branch elements includes along a portion of its length a numerical-aperture alteration taper having opposed small and large ends exhibiting, respectively, a small-end numerical aperture and a large-end numerical aperture lower in magnitude than the small-end numerical aperture; (d) the alteration taper of each light-guiding branch element including an alteration taper is oriented such that the small end is more proximate the incident end of the light-guiding branch element than the large end; and (e) the rigid light-guiding branch elements are secured in mutually-fixed relationship such that
  (i) the incident ends of the light-guiding branch elements are retained in fixed spatial relationship in accordance with a predetermined collection-array format exhibiting a collection-array density, and
  (ii) the emission ends of the light-guiding branch elements are retained in accordance with a predetermined output-array format exhibiting an output-array density more dense than the collection-array density.

11. The light-conduction assembly of claim 10 wherein at least one of
  (i) the predetermined collection array format is such that the incident ends of light-guiding branch elements are retained in spaced-apart relationship; and
  (ii) the emission ends of the light-guiding branch elements are secured in contacting relationship such that their emission ends collectively form a continuous output face that is one of (i) planar and (ii) curved.

12. The light-conduction assembly of claim 11 wherein
  (i) the incident ends of the plural branch elements are retained in accordance with a collection-array format corresponding to a predetermined illumination-array format according to which a plurality of light-emitting elements is arranged in fixed, mutually spaced-apart relationship; and
  (ii) the light-conduction assembly includes a light-guiding branch element corresponding to each light-emitting element.

13. A light-conduction assembly comprising a common output end and a plurality of at least two light-guiding branch elements, each light-guiding branch element including an incident end and an emission end;
  wherein (a) each light-guiding branch element is rigid over the entire length thereof between the incident and emission ends; (b) each incident end includes a light-collecting incident face and the emission end includes an emission face coinciding with the common output end of the light-conduction assembly; (c) each rigid light-guiding branch element includes along a portion of its length a numerical-aperture alteration taper having opposed small and large ends exhibiting, respectively, a small-end numerical aperture and a large-end numerical aperture lower in magnitude than the small-end numerical aperture; (d) the alteration taper of each light-guiding branch element is oriented such that the small end is more proximate the incident end of that light-guiding element than the large end; and (e) the rigid light-guiding branch elements are secured in mutually-fixed relationship such that
  (i) the incident ends of the light-guiding branch elements are retained in fixed spatial relationship in accordance with a predetermined collection-array format exhibiting a collection-array density, and
  (ii) the emission ends of the light-guiding branch elements are retained in accordance with a predetermined output-array format exhibiting an output-array density more dense than the collection-array density.

14. The light-conduction assembly of claim 13 wherein at least one of
  (i) the predetermined collection array format is such that the incident ends of light-guiding branch elements are retained in spaced-apart relationship; and
  (ii) the emission ends of the light-guiding branch elements are secured in contacting relationship such that their emission ends collectively form a continuous output face that is one of (i) planar and (ii) curved.

15. The light-conduction assembly of claim 14 wherein
  (i) the incident ends of the plural branch elements are retained in accordance with a collection-array format corresponding to a predetermined illumination-array format according to which a plurality of light-emitting elements is arranged in fixed, mutually spaced-apart relationship; and
  (ii) the light-conduction assembly includes a light-guiding branch element corresponding to each light-emitting element.

* * * * *